United States Patent
Al-Salqan et al.

(10) Patent No.: US 6,711,681 B1
(45) Date of Patent: Mar. 23, 2004

(54) CRYPTOGRAPHIC AUTHORIZATION WITH PRIORITIZED AUTHENTICATION

(75) Inventors: Yayha Al-Salqan, San Jose, CA (US); Sangeeta Varma, Sunnyvale, CA (US); Aravindan Ranganathan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/306,009

(22) Filed: May 5, 1999

(51) Int. Cl.[7] .............................. H04K 1/00; H04L 9/00
(52) U.S. Cl. ...................... 713/184; 713/166; 713/168; 713/182; 713/183; 713/184; 713/185; 707/9; 709/225; 709/227; 709/229
(58) Field of Search .................. 713/202, 168, 713/182–185, 166; 707/9; 709/225, 227, 229

(56) References Cited

U.S. PATENT DOCUMENTS

| | | | | |
|---|---|---|---|---|
| 5,710,817 A | * | 1/1998 | Sjooquist ..................... | 713/159 |
| 5,774,551 A | * | 6/1998 | Wu et al. .................... | 713/155 |
| 5,848,412 A | * | 12/1998 | Rowland et al. ............... | 707/9 |
| 6,023,762 A | * | 2/2000 | Dean et al. .................. | 713/193 |
| 6,035,406 A | * | 3/2000 | Moussa et al. ............. | 713/202 |
| 6,105,132 A | * | 8/2000 | Fritch et al. ................ | 713/167 |
| 6,304,973 B1 | * | 10/2001 | Williams ..................... | 713/201 |

OTHER PUBLICATIONS

Making Login Services Independent of Authentication Technologies, Vipin Samar, Charlie Lai, SunSoft Inc.; Conference on Computer and Communications Security, Mar. 1996.*

Application of a Multilevel Access Model in the Development of a Security Infrastructure for a Clinical Information System, 1994 AMIA, Inc.*

Davis, R: "Network Authentication Tokens" Computer Security Applications Conference 1989 Fifth Annual Tucson AZ, Dec. 4–8, 1998 Los Alamitos, CA USA, IEEE Comput. Soc. US Page(s) 234–238 XP010017880, ISBN: 0–8186–2006–4, p. 236, right–hand column., line 19, paragraphs ACCESS control p. 237 right–hand column, line 2, p. 234, left–hand column line 44, paragraph AUTHENTICATION p. 235, right–hand column, line 26.

Samar, V: Unified Login with Pluggable Authentication Modules (PAM), 3rd ACM Conference on Computer and Communications Security, Proceedings of 3$^{rd}$ ACM Conference on Computer and Communications Security, New Delhi, India, Mar. 14–16, 1996, New York, NY, USA , AM, USA Page(s) 1–10 XP000620972 ISBN: 0–89791–829–0, p. 42, left–hand column, line 11, paragraphs Configuration Management, p. 5 right–hand column line 31, p. 5, right–hand column line 39–, p. 5, right–hand column, line 42, p. 6, right–hand column, line 1 p. 6, right–hand column line 7.

* cited by examiner

Primary Examiner—Gregory Morse
Assistant Examiner—Christopher J Brown

(57) ABSTRACT

A system and associated method for authorizing, or withholding authorization of, user access to a selected computer application or other resource, based on the user's response to one or more user authentication tests. If the user satisfies one or more authentication tests but satisfies less than all the tests, the system optionally allows the user access to a selected subset of the resource. Alternatively, the user loses access to a selected subset of the application for each test not satisfied by the user. An authentication test or its associated weight may change at a selected time, and the selected time may be determined with reference to a time at which the resource changes.

21 Claims, 8 Drawing Sheets

CRYPTOGRAPHIC AUTHORIZATION WITH PRIORITIZED AUTHENTICATION

FIELD OF THE INVENTION

This invention relates to use of one or more authentication mechanisms in secure communications.

BACKGROUND OF THE INVENTION

During the last decade of the Twentieth Century, the Internet has become a vital communication medium for a variety of application domains, including simple e-mail, home banking, electronic trading of stocks, net-based telephonic communications and many other electronic commerce applications. Authentication of a user is becoming a key requirement in allowing or authorizing a legitimate user to execute the user's privileges in a particular network or sub-network.

Presently, many user authentication mechanisms are available, including simple user name/password, one-time password (e.g., S/Key), RSA-based digital signature authentication, Kerberos, challenge-and-response, and Secure Socket Layer SSL v3.0 with user/client authentication. Bruce Schneier, in Applied Cryptography, John Wiley & Sons, Inc., New York, Second Edition, 1996, pp. 34–74 and 566–572, discusses and characterizes several user and/or key authentication tests that are often based on, or associated with, an underlying encryption procedure.

One interesting authentication scheme is the Sun Pluggable Authentication Mechanism (PAM), discussed in more detail in the following, which facilitates integration of several authentication packages or tests without requiring change of the underlying application (e.g., login). Although a system such as PAM provides a framework for integration, such a system often deals with the plurality of authentication mechanisms as if all have the same cryptographic or authentication strength or priority. For example, one enterprise might require both Kerberos (relatively strong) and user password (relatively weak) to be used for user authentication. Use of several authentication modules can be accommodated within PAM, through the use of stacking. If the user fails to pass one of the authentication tests, among many that are applied in stacking, authentication is denied, without indicating which of the many tests the user has failed to pass. PAM treats all authentication tests in an integrated package as equally strong and equally suitable.

What is needed is a system that integrates one or more authentication tests but allows assignment of a priority or strength to each of such tests and allows authentication to be treated as a necessary, but not a sufficient, condition for user authorization. Preferably, where authentication tests are integrated, these tests should be executed based on an indicium that is a measure of priority and/or strength for each authentication test. Preferably, the system should allow identification of, and take account of, which authentication test or tests the user has failed to pass and should grant or withhold access to selected subsets of a resource, depending upon which tests are passed. Preferably, the system should be flexible enough to allow assignment of different priorities and/or strengths to tests within an integrated authentication package, based on the application and the current circumstances.

SUMMARY OF THE INVENTION

These needs are met by the invention, which provides a system that integrates one or more authentication tests and allows assignment of arbitrary (and changeable) relative priority and/or relative strength to each of these tests. In one embodiment, the system allows an integrated electronic authentication system to accept physical objects, such as drivers licenses, birth certificates, passports, social security cards and the like for partial or full authentication of a user, although each of these documents is used for a different primary purpose, and the purposes seldom overlap.

In a first embodiment, the system applies one or more authentication tests with increasing or differing numerical priority or strength and grants access to a resource or selected subset thereof (which may be the empty set), depending upon which test or tests are satisfied. In another embodiment, the system withdraws access to a selected subset (which may be the empty set) of a resource for each authentication test the user fails to satisfy.

The invention has the following advantages: (1) the invention strengthens an association or linkage between authentication and the authorization process; (2) the invention allows identification of which authentication test(s) is being used; (3) the invention extends an integration procedure, such as PAM, without distorting the procedure; (4) the invention enhances total security of the authorization process; (5) the invention preserves and deals with authentication mechanisms based on their relative merits and can allocate relative priority based on relative cryptographic strength; and (6) the invention allows an entity to classify those with whom it deals (customers, suppliers, etc.) for authorization purposes.

BRIEF DESCRIPTION OF THE DRAWINGS

Prior Art

DETAILED DESCRIPTION OF THE INVENTION

Figure 1:
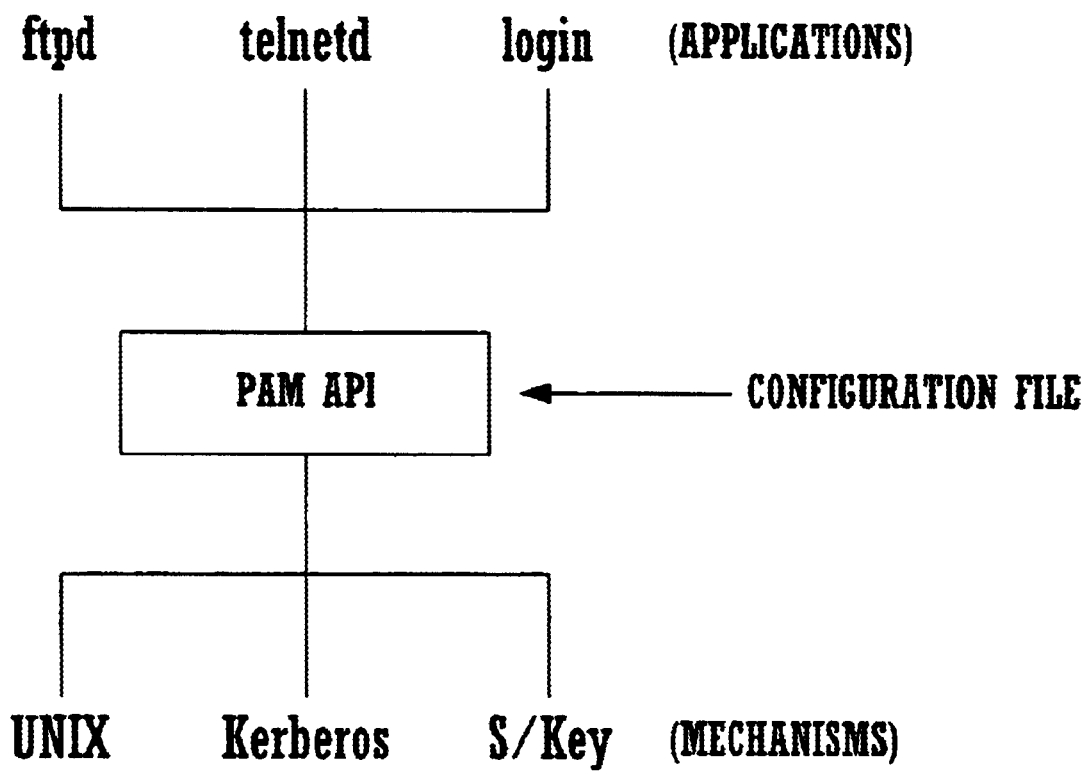
FIG. 1 illustrates the architecture of a resource access system that requires user authentication.

In the invention, user authentication is treated as a necessary, but not sufficient, condition for user authorization in this system. Authorization level varies from user to user, based on the user's role, group membership, privileges, past behavior and the like. If the user satisfies or passes all authentication tests, the user is allowed access to a maximal set, consistent with the user's status, of domains or privileges. If the user passes some, but not all, of the authentication tests, the user is allowed access to a selected subset of the maximal domain, where the selected subset may be a proper subset or may be the maximal set and will vary according to the tests passed, or not passed.

Strength of an authentication test can be objectively evaluated. For example, SSL v3.0 with authentication is believed by many to be a stronger authentication test than is Kerberos, discussed in Schneier, op cit, pp. 566–572; and Kerberos is considered to be a stronger test than a simple user/password test. If these three authentication test are integrated, an assessment of authentication relative strength for use in the invention might run as follows.

| Authentication test | Relative strength |
|---|---|
| SSL v3.0 | 1 |
| Kerberos | 2 |
| User/password | 3 |

A weight $w_i$ ($0 \leq w_i \leq 1$) may be assigned to each authentication test, with a higher weight being assigned to a test with higher relative strength. In one embodiment, relative priority of an authentication test is equated with the relative strength of a test. In another embodiment, relative priority is assigned to each of several tests, independently of their relative strengths, based on the circumstances in which the tests will be used in an integrated approach.

The Pluggable Authentication Mechanism (PAM) is discussed in detail by Vipin Samar and Charles Lai in "Making Login Services Independent of Authentication Technologies", presented at the Third ACM Conference on Computer and Communications Security, March 1996, is useful as a guide in implementing the invention. The Samar et al. article notes that most UNIX systems presently use a login procedure based on a modified Data Encryption Standard (DES) algorithm, which assumes that the password cannot be guessed and that the password does not pass over the communications channel in cleartext. These assumptions are acceptable when communications occur only within a trusted network. However, an open network, such as an internet, requires use of more restrictive and stronger authentication mechanisms. Examples of these stronger mechanisms include Kerberos, RSA digital signature, Diffie-Hellman, S/Key and other one-time passwords, and challenge-and-response and mart card authentication systems.

One goal of a PAM system is to require a possibly-different methods of authentication, depending upon the application. For example, a site may require S/Key password authorization for telnetd access but allow console login access after presentation of a UNIX password. Another goal of a PAM system is a requirement that a user pass more than one authentication test, such as Kerberos and RSA digital signature tests, to obtain access to a particular resource or application. Another goal is that system-access services should not have to change when an underlying authentication mechanism changes.

Core components of a suitable authentication framework include: (1) one or more applications or resources, such as login, telnetd and ftpd, to which a user seeks access; (2) an authentication mechanism library, such as a PAM Application Programming Interface (API) or library (the front end); and (3) specific authentication modules, such as Kerberos, S/Key and UNIX user password (the back end). FIG. 1 illustrates a relationship between these three components. When a user seeks access to a particular application or resource, the application calls a PAM API, which in turn calls one or more authentication modules that are required for access to that application. The appropriate authentication module(s), as determined by the API, is/are loaded and presented to the user. If the user responds correctly to the authentication test(s) in a PAM, access is granted. If the user responds incorrectly, access is denied and, optionally, the user is given another opportunity to respond correctly to the test(s).

A resource access system may be divided into four areas of management functionality: authentication, account, session and password. Authentication management authenticates the user and refreshes, upgrades or destroys the user credentials. Account management checks user account expiration and access hour restrictions, if any, and determines whether a user has access to the resource at that particular date and at that particular time. Session management is used for accounting and billing purposes and, optionally, to determine the amount of time the user has had access to the resource in the current session (useful where the user's contact time is restricted). Password management is used to change the password from time to time. The PAM implements each of these four management items as a separate, pluggable module. A particular user may not need to be interrogated or monitored by all four modules. Alternatively, the user's access request may be processed in parallel by two or more of the four modules.

According to the invention, the authentication system may allocate a strength and/or a priority to each of several authentication mechanisms associated with a particular application or resource, may apply these mechanisms in a particular order, and/or may require that the user satisfy or pass at least a selected number of these tests in order to gain access to the application. Each associated authentication test may have an assigned weight value $w_i$ ($0 \leq w_i \leq 1; i=1, \ldots, I$; $I \geq 1$), which may increase with increasing strength or priority for the associated test, and the system may assign to the user a "test score"

$$TS = \sum_{i=1}^{I} w_i ATS(i), \qquad (1)$$

where ATS(i)=1 if the user passes authentication test number i and ATS(i)=0 otherwise. The system optionally denies user access to the application unless the user's test score is at least equal to a selected threshold test score value $TS_{thr}$ (i.e., $TS \geq TS_{thr}$), even if the user passes at least one of the associated authentication tests. The threshold test score $TS_{thr}$ may vary with the particular application for which access is sought.

Figure 2A:
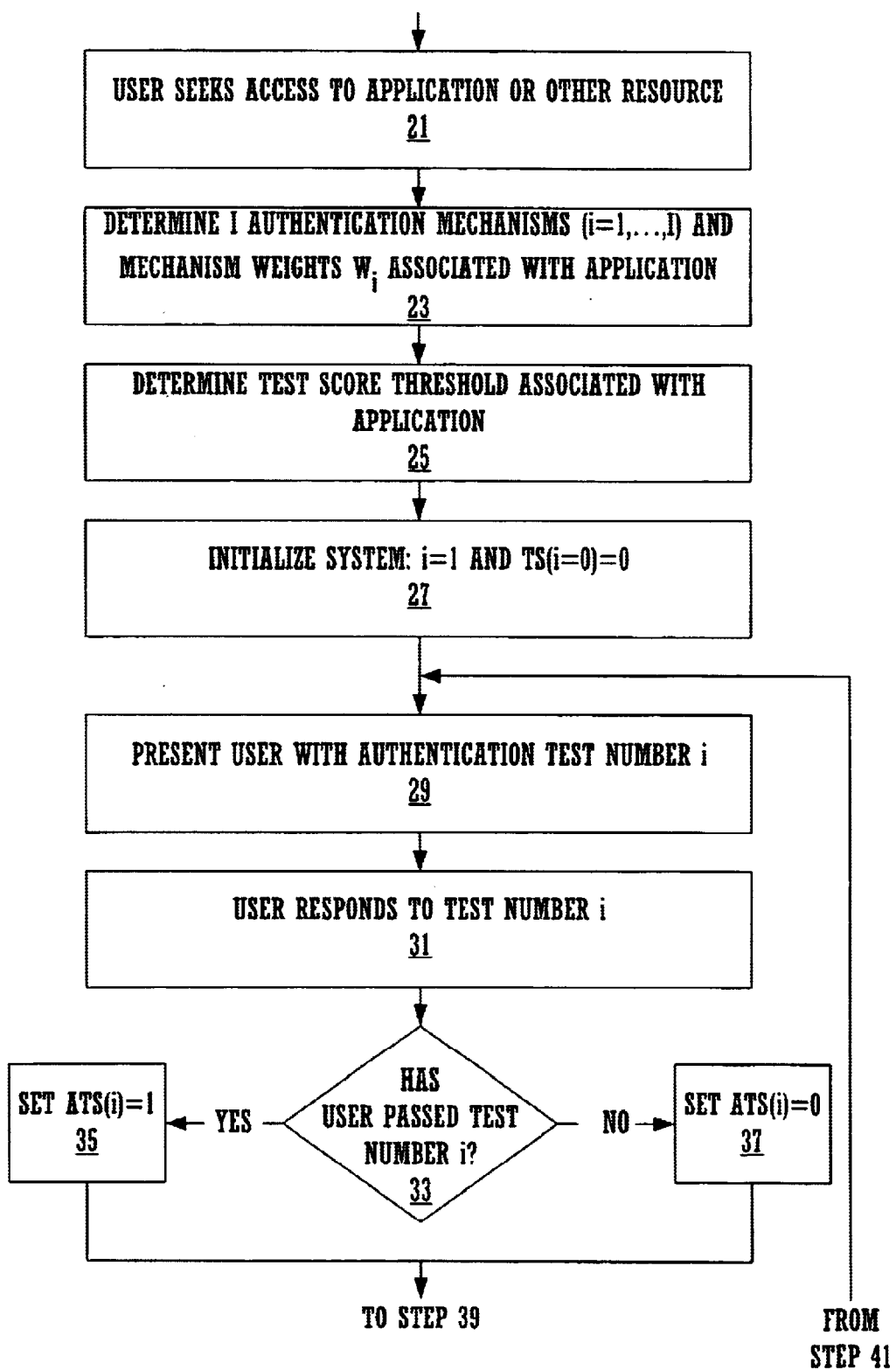
FIGS. 2A–2B and 3A–3B–3C are flow charts of procedures for practicing single-threshold and multiple-threshold embodiments of the invention, respectively.
Figure 2B:
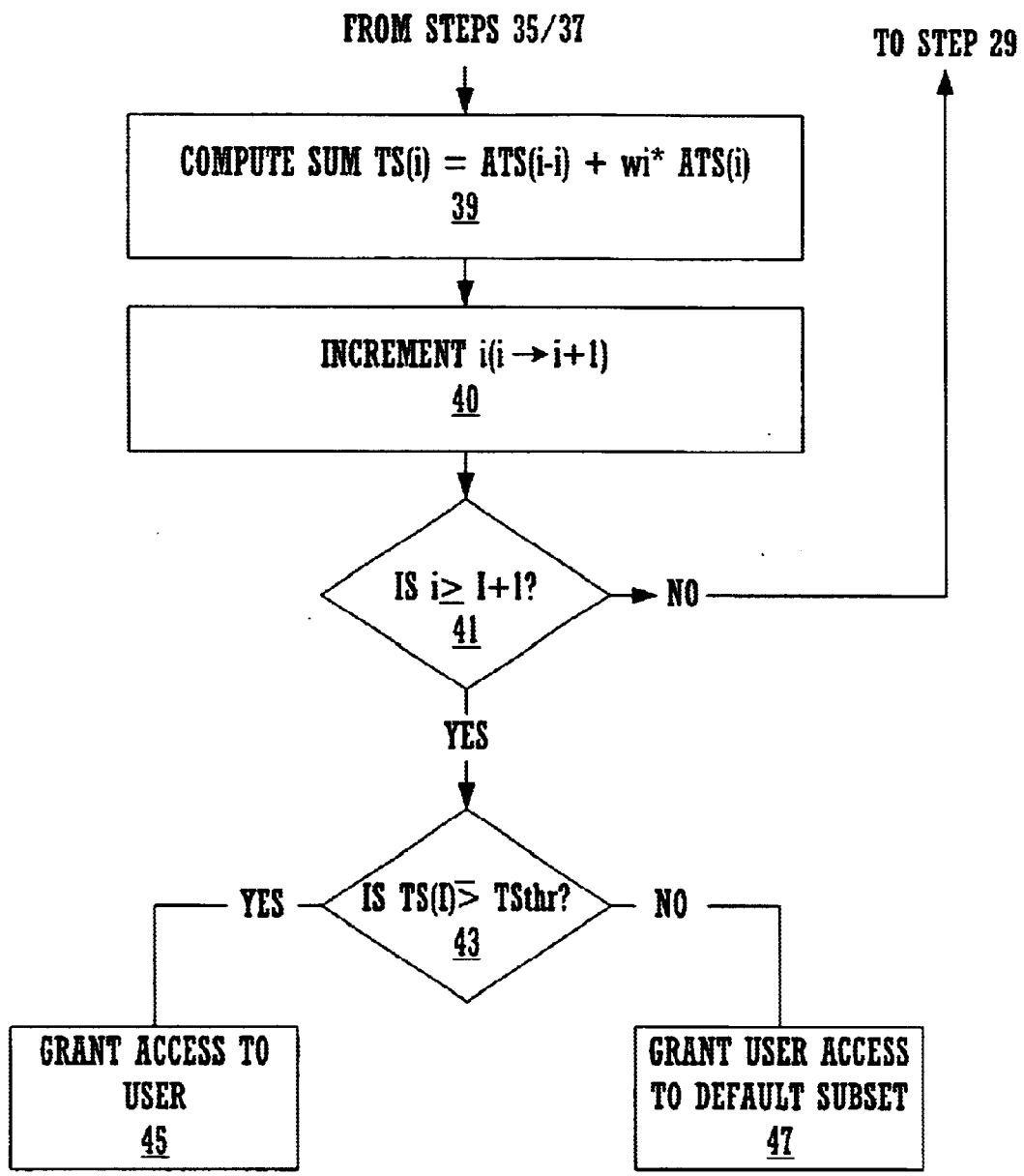

FIGS. 2A–2B present a flow chart illustrating a procedure that incorporates this approach. In step 21, the user seeks access to a particular application or resource. In step 23, the system determines which authentication mechanisms (i=1, . . . , I) are associated with access to the chosen application. In step 25, the system determines the test score threshold associated with the chosen resource. In step 27, the system is initialized, with i=1 and TS(0)=0. In step 29, the system presents the user with authentication mechanism number i, and the user responds to this test number i in step 31. In step 33, the system determines whether the user has passed authentication test number i. If the answer to the query in step 33 is "yes," the system sets ATS(i)=1, in step 35, and passes to step 39 (FIG. 2B). If the answer to the query in step 33 is "no,", the system sets ATS(i)=0, in step 37, and passes to step 39. In step 39 (FIG. 2B), the system multiplies ATS(i) by a weight $w_i$ assigned to the test number i, adds the quantity $w_i ATS(i)$ to the old sum TS(i−1) to form a new sum TS(i), and increments the index i (i→i+1), in step 40. In step 41, the system determines whether i satisfies the condition $i \geq I+1$. If the answer to the query in step 41 is "no," the system returns to step 29 and repeats steps 29, 31, 33, 39, 40 and 41 at least once. If the answer to the query in step 41 is "yes," the system moves to step 43 and compares the sum TS(I) with the associated threshold test score $TS_{thr}$. If $TS(I) \geq TS_{thr}$, user access to the application is granted, in step 45. If $TS(I) < TS_{thr}$, user access to a default subset of the application is granted, in step 47, where the default subset may be the empty set.

Alternatively, the system may set a strictly monotonic sequence of test score threshold values, $TS_{thr,1}$, $TS_{thr,2}$, ..., $TS_{thr,N}$ with $TS_{thr,1} < TS_{thr,2} < ... < TS_{thr,N}$ and $N \geq 1$, and may allow the user access to a selected subset of the full resource, depending upon which threshold values the user's test score equals or exceeds. As the user's test score TS(I) increases, the user is granted access to more and more subsets of the target application.

Figure 3A:
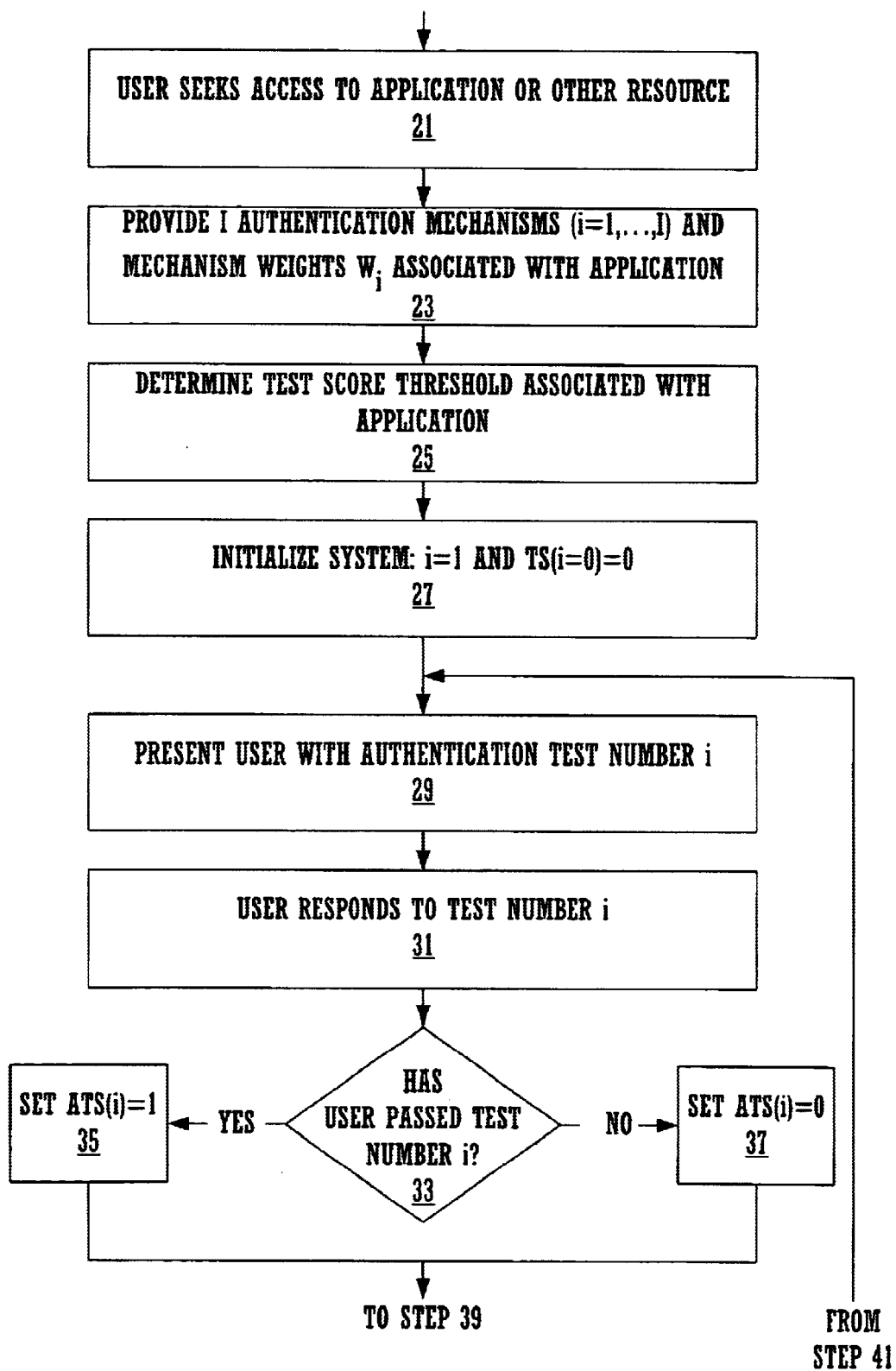
Figure 3B:
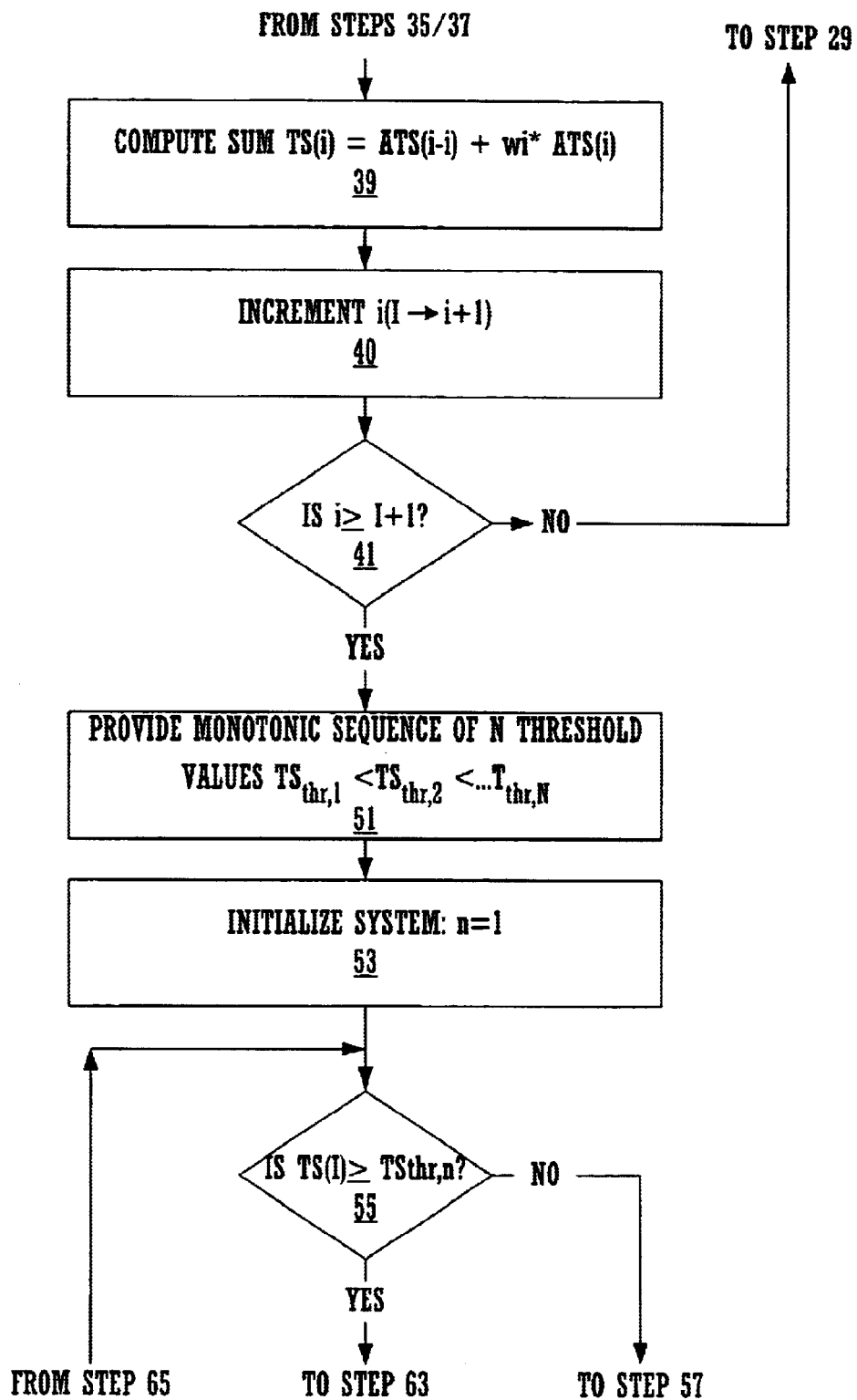
Figure 3C:
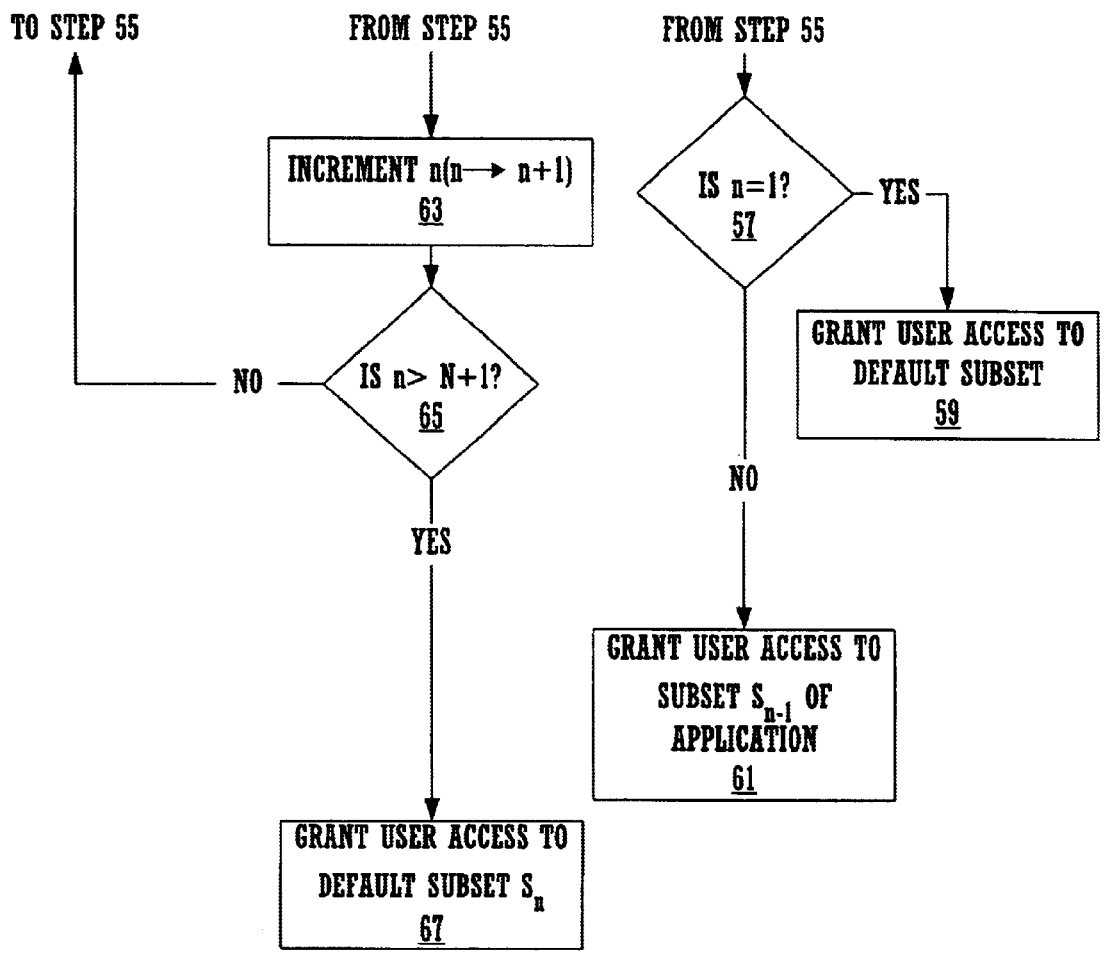

FIGS. 3A–3B–3C illustrate the procedure according to this alternative embodiment. Steps 21–41 in FIGS. 3A–3B–3C are performed as in FIGS. 2A–2B to compute the sum TS(I). In step 51 (FIG. 3B), the system provides a monotonic sequence of N threshold values ($N \geq 2$), $TS_{thr,1} < TS_{thr,2} < ... < TS_{thr,N}$, that will be used to determine what access, if any, the user may be granted within the application or resource. In step 53, the system is initialized by setting a counting index n=1. In step 55, the system determines whether the sum TS(I) satisfies the condition $TS(I) \geq TS_{thr,N}$. If the answer to the question in step 55 is "no", the system determines whether n=1, in step 57 (FIG. 3C).

If the answer to the question in step 57 is "yes", the system grants the user access to a first default subset $S_0$ of the application, in step 59.

This first default subset can be the empty subset, which effectively denies the user access to any part of the application. If the answer to the question in step 57 is "no", corresponding to n>1, the system grants the user access to a selected subset $S_{n-1}$ of the application.

If the answer to the question in step 55 is "yes", the system increments the count index n (n→n+1), in step 63, and determines whether n satisfies the condition $n \geq N+1$, in step 65. If the answer to the question in step 65 is "no", the system returns to and repeats step 55 at least once. If the answer to the question in step 65 is "yes", the system grants the user access to another default subset $S_N$, which is optionally the entire application, in step 67.

The preceding embodiments may be characterized as "bottom up" approaches, in which the system allows user access to a default subset of the application or resource, which may be the empty set, initially. The system also allows access by the user to more and more of the application or resource as the user satisfies or passes more and more of the authentication tests.

Figure 4A:
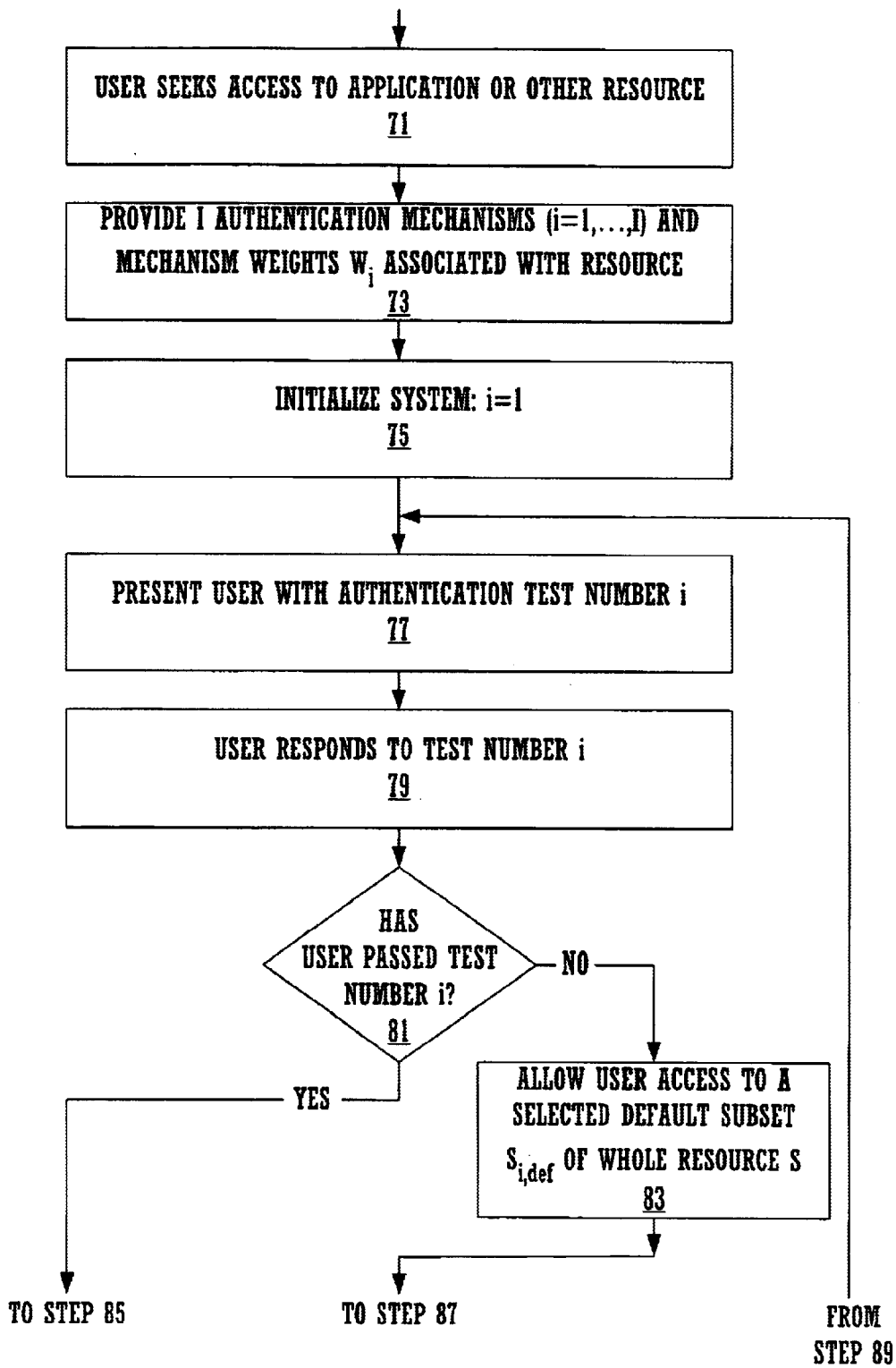
FIGS. 4A–4B are a flow chart for practicing a "top down" embodiment of the invention.
Figure 4B:
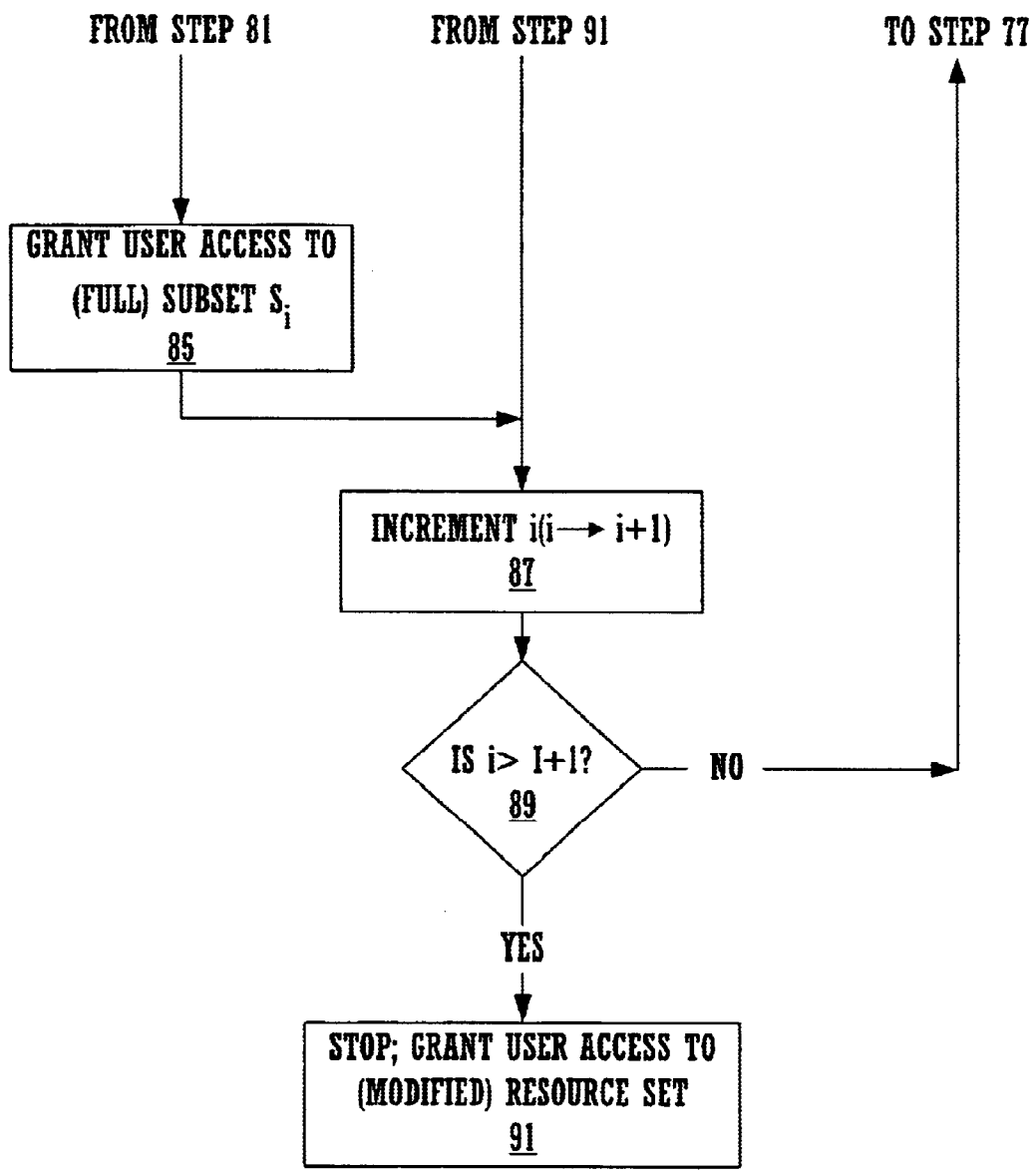

In an alternative "top down" approach, illustrated in a flow chart in FIGS. 4A–4B, the user begins with potential access to the entire resource or application and loses access to particular subsets of the resource as the user fails to satisfy or pass one or more of the authentication tests. In step 71, the user seeks access to a resource, or to a subset thereof. In step 73, the system provides I authentication mechanisms, numbered i=1, 2, ..., I ($I \geq 1$) associated with that application. In step 75, the system is initialized at i=1. In step 77, the user is presented with authentication test number i, and the user responds to test number i in step 79. In step 81, the system determines whether the user has passed test number i.

If the answer to the query in step 81 is "yes", the system grants the user access to a selected resource subset $S_i$, in step 85 (FIG. 4B). The system then moves to step 87 and increments the count index i (i→i+1). In step 89, the system determines whether the count index i satisfies the condition $i \geq I+1$. If the answer to the query in step 89 is "yes", the system moves to step 91 and grants the user access to the full resource set, or a modified or default version thereof. If the answer to the query in step 89 is "no", the system returns and repeats steps 77, 79 and 81 at least once.

If the answer to the query in step 81 is "no", the system grants the user access to a selected default subset $S_{i,def}$ of the resource subset $S_i$, in step 83, and optionally continues with step 87, where the count index i is incremented and tested against I+1 (Step 89); The default subset $S_{i,def}$ is optionally the empty set.

At the end of the procedure(s) shown in FIGS. 4A–4B, if the user has failed to satisfy or pass the authentication tests number i=i1, i2, ..., iM, among the total number I of authentication tests ($0 \leq M \leq I$; $I \geq 1$), the system allows the user access to one or more of certain default subsets, $S_{i1,def}$, $S_{i2,def}$, ..., $S_{iM,def}$, so that the user now has access to the union of these default subsets of the original "whole" resource or application set S. Each time the user satisfies or passes an authentication test, the subset of the resource to which the user has access is unchanged (no loss at this stage).

Where multiple users are present, first and second users who seek access to different portions of a resource are optionally presented with different sequences of authentication tests to determine the portion of the resource to which each user will be granted access. For example, the first user may be presented with authentication tests number one, two and four for access to a first selected portion of the resource; and the second user may be presented with authentication tests number two, three, four and five for access to a second selected portion of the resource. Alternatively, where the first and second users pass the same authentication test (e.g., test number two), the portion of the resource to which each is granted access may be different for each user. For example, the first and second users may be granted access to different portions of a given confidential document affecting national security, because these two users have different "needs to know."

The resource or application to which a user seeks access may change from time to time. For example, a resource may include a collection of documents of various levels of classification (e.g., company private and confidential, secret and top secret at the federal level), and the level of authentication required for access may be set by the document(s) with the highest level of confidentiality. The federal government downgrades the classification of selected documents from time to time, and the authentication level required may be correspondingly reduced as a result of this downgrade, or as a result of removal of one or more documents from the resource. Conversely, one or more additional documents with a higher classification level may be added to the resource, and this upgrade in classification may require an increase in authentication level for access to the resource.

In another alternative embodiment, one or more authentication levels or tests associated with a given resource optionally changes at a given time, possibly as a result of change of characterization of the resource, or of one of more documents or other objects that are part of or associated with the resource. This change would be implemented at a time that is approximately contemporaneous with the change in characterization and would be subject to subsequent changes in characterization.

The preceding embodiments may be implemented by presenting the user with a sequence of one or more authentication tests and requiring the user to affirmatively "pass" one or more of these tests, in order to obtain access to part or all of the resource.

Alternatively, the user may be issued a smartcard containing cleartext and/or (preferably) encrypted responses or "keys" to I authentication tests ($I \geq 2$), where each response may, but need not, correspond to passage of an authentication test. In this approach, the user presents his/her smartcard to the system, the system reads the card and determines which, if any, of the entries on the smartcard correspond to passage of an authentication test, and which test. The smartcard is read by a computer, which tracks which authentication tests the smartcard has "passed" and thereby determines a corresponding subset of the resource (which may the whole resource, a proper subset of the whole resource, or the empty set) to which the user has access, based on the user's smartcard score. Preferably, the smartcard requires specification of a card owner's PIN, which must correspond to the smartcard presented, in order to read the smartcard and determine its score on one or more authentication tests. This approach requires possession of both the smartcard and special knowledge (the PIN) before access to (portions of) a resource is granted.

The Pluggable Authentication Mechanism (PAM), which provides integration of one or more authentication tests, is compatible with the invention. The PAM need not be altered, only enhanced, in order to implement the invention.

What is claimed is:

1. A method of authorization of user access to a selected resource, the method comprising the steps of:
   providing at least first and second user authentication mechanisms for authenticating a user who seeks access to a resource, where each authentication mechanism has an associated numerical strength;
   providing an authentication integration procedure that assigns a relative priority to each of the at least first and second authentication mechanisms based on the relative strength of each mechanism; and
   when the user satisfies a first test associated with the first authentication mechanism but fails to satisfy a second test associated with the second authentication mechanism, authorizing access by the user to a selected subset of the resource based on the at least one test satisfied by the user.

2. The method of claim 1, further comprising the step of authorizing access by said user to said resource when said user satisfies at least one test associated with said first authentication mechanism and satisfies at least one test associated with said second authentication mechanism.

3. The method of claim 1, further comprising the step of denying access by said user to said resource when said user fails to satisfy at least one test associated with said first authentication mechanism and fails to satisfy at least one test associated with said second authentication mechanism.

4. The method of claim 1, further comprising the step of authorizing access by said user to a selected default subset of said resource when said user fails to satisfy at least one test associated with said first authentication mechanism and fails to satisfy at least one test associated with said second authentication mechanism.

5. The method of claim 1, further comprising the step of associating a numerical strength with each of said authentication mechanisms.

6. The method of claim 5, further comprising the step of selecting said associated strength of at least one of said first and second authentication mechanisms to be a selected cryptographic strength.

7. The method of claim 1, further comprising the step of causing a change in at least one of said test associated with said first authentication mechanism and said test associated with said second authentication mechanism at a selected time.

8. The method of claim 7, further comprising the step of choosing said selected time to be approximately equal to a time at which said resource changes.

9. The method of claim 1, further comprising the step of receiving at least one response from said user to at least one of said tests by receiving information from a smartcard that is programmed to provide the smartcard information in response to receiving a selected electronic command.

10. A method of authorization of user access to a selected resouce, the method comprising the steps of:
    providing I user authentication tests (I being greater than or equal to 1) for authenticating a user who seeks access to a resource;
    receiving a response from the user for each of the authentication tests; and for each authentication test that the user does not satisfy withholding access to a selected subset of the resource from the user;
    causing a change in said test associated with at least one of said authentication mechanisms at a selected time; and
    choosing said selected time to be approximately equal to a time at which said resource changes.

11. A system for authorization of user access to a selected resource, the system comprising a computer that is programmed:
    to provide at least first and second user authentication mechanisms for authenticating a user who seeks access to a resource, where each authentication mechanism has an associated numerical strength;
    to provide an authentication integration procedure that assigns a relative priority to each of the at least first and second authentication mechanisms based on the relative strength of each mechanism; and
    when the user satisfies a first test associated with the first authentication mechanism but fails to satisfy a second test associated with the second authentication mechanism, to authorize access by the user to a selected subset of the resource based on the at least one test satisfied by the user.

12. The system of claims 11, wherein said computer is further programmed to authorize access by said user to said resource when said user satisfies at least one test associated with said first authentication mechanism and satisfies at least one test associated with said second authentication mechanism.

13. The system of claims 11, wherein said computer is further programmed to deny access by said user to said resource when said user fails to satisfy at least one test associated with said first authentication mechanism and fails to satisfy at least one test associated with said second authentication mechanism.

14. The system of claim 11, wherein said computer is further programmed to authorize access by said user to a selected default subset of said resource when said user fails to satisfy at least one test associated with said first authentication mechanism and fails to satisfy at least one test associated with said second authentication mechanism.

15. The system of claim 11, wherein said computer is further programmed to associate a numerical strength with each of said authentication mechanisms.

16. The system of claim 15, wherein said computer is further programmed to select said associated strength of at least one of said first and second authentication mechanisms to be a selected cryptographic strength.

17. The system of claim 11, wherein said computer is further programmed to cause a change in at least one of said test associated with said first authentication mechanism and said test associated with said second authentication mechanism at a selected time.

18. The system of claim 17, wherein said computer is further programmed to choose said selected time to be approximately equal to a time at which said resource changes.

19. The system of claim 11, further comprising a smartcard, associated with said user, that communicates with said computer, that contains information related to at least one response from said user to at least one of said tests, and that is programmed to provide the smartcard information in response to receiving a selected electronic command.

20. A system for authorization of user access to a selected resource, the system comprising a computer that is programmed:
- to provide I user authentication tests (I being greater than or equal to 1) for authenticating a user who seeks access to a resource;
- to receive a response from the user for each of the authentication tests; and for each authentication test that the user does not satisfy, to withhold access to a selected subset of the resource from the user;
- to cause a change in said test associated with at least one of said authentication mechanisms at a selected time; and
- to choose said selected time to be approximately equal to a time at which said resource changes.

21. An article of manufacture comprising:
a computer readable medium having computer readable program code means embodied in the medium for authorizing access to a resource, the computer readable program code means in the article of manufacture comprising:
- computer readable program code means for providing I user authentication tests (I being greater than or equal to 1) for authenticating a user who seeks access to a resource;
- computer readable program code means for receiving a response from the user for each of the authentication tests; for each authentication test that the user does not satisfy computer readable program code means for withholding access to a selected subset of the resource from the user;
- computer readable program code means for causing a change in said test associated with at least one of said authentication mechanisms at a selected time; and computer readable program code means for choosing said selected time to be approximately equal to a time at which said resource changes.

\* \* \* \* \*

UNITED STATES PATENT AND TRADEMARK OFFICE
CERTIFICATE OF CORRECTION

PATENT NO.    : 6,711,681 B1
DATED         : March 23, 2004
INVENTOR(S)   : Yahya Al-Salqan et al.

Page 1 of 1

It is certified that error appears in the above-identified patent and that said Letters Patent is hereby corrected as shown below:

<u>Title page,</u>
Item [75], Inventors, the first inventor's name is corrected from "Yayha Al-Salqan" to -- Yahya Al-Salqan --.

Signed and Sealed this

Second Day of November, 2004

JON W. DUDAS
*Director of the United States Patent and Trademark Office*